United States Patent [19]

Carreras et al.

[11] Patent Number: 4,740,677
[45] Date of Patent: Apr. 26, 1988

[54] AXIS SEPARATOR ELECTRONIC TRANSLATOR

[75] Inventors: Richard A. Carreras; Mark G. Baciak; Elinor L. Coates, all of Albuquerque; Morton Jenks, Corrales, all of N. Mex.

[73] Assignee: The United States of America as represented by the Secretary of the Air Force, Washington, D.C.

[21] Appl. No.: 941,480

[22] Filed: Dec. 15, 1986

[51] Int. Cl.$^4$ .......................... G01J 1/20; G01B 11/26; G01C 1/00
[52] U.S. Cl. ...................................... 250/201; 356/141
[58] Field of Search ..................... 250/201 R; 356/141, 356/152, 561, 356

[56] References Cited

U.S. PATENT DOCUMENTS

| | | | |
|---|---|---|---|
| 4,384,198 | 5/1983 | Williamson | 250/203 R |
| 4,639,586 | 1/1987 | Fender et al. | 250/201 |
| 4,667,090 | 5/1987 | Carreras et al. | 250/203 R |
| 4,689,758 | 8/1987 | Carreras | 250/201 |

Primary Examiner—David C. Nelms
Assistant Examiner—William L. Oen
Attorney, Agent, or Firm—William G. Auton; Donald J. Singer

[57] ABSTRACT

In an optically phased array of multiple laser telescopes, the phasing between the telescopes is accomplished by sampling adjacent outgoing wavefronts. The two samples of each wavefront are then combined to form an interference pattern on a camera. This image is then converted to digital signals, employing an error signal representative of the phase difference. It is necessary that the telescopes be pointing in the same direction. This is assured by having each telescope associated with an optical sensor which produces an X or Y tilt error. The X or Y tilt error is corrected by the optical component referred to as the optical path difference adjustor (OPDA). A signal processing circuit is disclosed which receives X and Y tilt error signals, as well as phase error signals, and produces therefrom drive signals which correct and drive the OPDA in an array of multiple laser telescopes.

9 Claims, 3 Drawing Sheets

AXIS SEPARATOR ELECTRONIC TRANSLATOR

STATEMENT OF GOVERNMENT INTEREST

The invention described herein may be manufactured and used by or for the Government for governmental purposes without the payment of any royalty thereon.

CROSS-REFERENCE TO RELATED APPLICATIONS

The subject matter of this application is related to the subject matter contained in the following U.S. Pat. applications: application Ser. No. 698,962, now U.S. Pat. No. 4,639,586, filed Feb. 6, 1985, entitled "Optically Phased Laser Transmitter" by Janet S. Fender et al; Application Ser. No. 689,700, now U.S. Pat. No. 4,689,758 filed Jan. 8, 1985, entitled "Microcomputer Controlled Image Processor" by Richard Carreras, and Application Ser. No. 743,338, now U.S. Pat. No. 4,667,090, filed Jun. 10, 1985, entitled "Synthetic Aperture Multi-Telescope Tracker Apparatus" by Richard A. Carreras et al, the disclosures of which are incorporated herein by reference.

BACKGROUND OF THE INVENTION

The present invention relates generally to optically phased laser telescope systems, and more specifically to an electronic circuit which drives an optical path difference adjustor to bring separate laser beams into phase with each other by adjusting the length of their optical paths.

The optical phasing of separate transmitted beams of laser transmitters with monochromatic light sources is achieved by matching the optical paths. An excellent example of a successful system which uses an array of multiple optical laser telescopes to achieve the performance of a single laser transmitter of equivalent size, is disclosed in U.S. Pat. No. 4,639,586, issued Jan. 27, 1987 to Janet S. Fender et al, entitled "An Optically Phased Laser Transmitter."

The Fender apparatus performs phase matching between pairs of laser beams using an array containing at least two optical telescopes which become useable as a laser transmitter when combined with an optical phase matching system consisting of: a collecting telescope, a detector array, two fold mirrors, analog-to-digital (A/D) converter, microprocessor, and two sets of correcting mirrors.

The two optical telescopes are adjacent to each other, and transmit two separate outgoing laser beams which require phase matching. The original source of the two outgoing beams may be either: a single laser beam, which has been divided (monochromatic); or two separately transmitted polychromatic laser beams.

The collecting telescope sits in front of the two optic telescopes and bridges the gap between them. In this way, the collecting telescope is able to intercept samples of outgoing laser beams from the edges of both telescopes and focus them, through the two fold mirrors to the detector array.

The detector array may be either a line scan or an area charge coupled device (CCD), which reads out the fringe pattern by generating an interference pattern.

The A/D converter, microprocessor, and correcting mirrors are used to match the phase of the outgoing beams by adjusting the optical path lengths of the beams. The above-cited Carreras application discloses a system which performs the functions attributed to the analog-to-digital converter and microprocessor in the Fender application. The Carreras system receives the interference pattern between samples of pairs of transmitted laser beams from a CCD camera, then performs a calculation of the difference in optical path lengths between the two beams which allows the laser transmitter to match the phase of the outgoing beams.

The above-cited application of Carreras et al discloses an electrical tracking system, which is used to achieve simultaneous low-bandwidth tracking of the tilt-induced errors on the signal beams from three independent telescopes. Each signal beam is passed through the same rotating chopper wheel which includes strategically placed sampling apertures or holes to allow the sequential sampling of the return beams. The sampled beams are then focused onto a single photo-detector cell wherein the beams are multiplexed, thus allowing a single detector to sample all the return beams while providing a single common reference point. The sampled beam is combined with the direct return beam signal from each telescope to provide an error tilt compensation signal.

While phased array radar systems have been around for years, optically phased laser transmitters are a comparatively newly emerging technology. Among the needs of current systems are the need for improved methods of correcting optical path length adjustments. The task of correcting optical path lengths is alleviated to some extent, by the systems of the following U.S. Patents, the disclosures of which are incorporated herein by reference:

U.S. Pat. No. 3,599,112 issued to Holtz;
U.S. Pat. No. 4,239,392 issued to Pohle;
U.S. Pat. No. 4,326,800 issued to Fitts;
U.S. Pat. No. 4,384,198 issued to Williamson; and
U.S. Pat. No. 4,413,909 issued to Pohle.

Pohle U.S. Pat. No. 4,413,909 discloses a system for measuring and correcting for tilt and aberrations in a laser beam. In the patent reference subaperture wavefront is compared with other subaperture wavefronts. The subapertures are focused on a diffraction grating to form images with interference patterns. A measurement is made of the phase difference between intensity fluctuations of the interference patterns. A similar wavefront sampling system for a laser beam projector or telescope is disclosed in Pohle U.S. Pat. No. 4,239,392.

Fitts is concerned with an automatic alignment system for high energy lasers. A servo-control system includes a wavefront sensor which analyzes the wavefront profile of a low energy replica of the high energy beam and generates control signals which actuate a deformable mirror to correct spurious wavefront aberrations. Williamson shows a time shared aperture device with wavefront analyzers and Holtz is included for its disclosure of a laser generator with a telescopic optical system.

While the above cited references are instructive, a need remains for a mechanism to remove detected errors in optically phased laser transmitters. The present invention is intended to satisfy that need.

SUMMARY OF THE INVENTION

The present invention is a signal translator with multiple channels which receives X and Y tilt error signals, from an optically phased laser telescope system, and produces drive signals to an optical path difference adjustor (OPDA) to correct these errors on a correcting mirror system.

The optical path difference adjustor is composed of three sets of piezoelectric transducers which are mounted on the back of the correction mirror to tilt it in three dimensions. Each piezostack physically grows with applied voltage. This "applied voltage" is applied in the form of the drive signals from three channels of the present invention.

The axis separator electronic translator (ASET) receives three error signals: an optical path error signal, and an X and Y tilt error signal. Each channel of the ASET includes at least three bus driver amplifiers, which receive and boost the input error signals, and three summing amplifiers, which combine three combinations of the amplified error signals to produce three drive signals for three piezostacks in the OPDA.

The ASET and piezostacks of the OPDA correct X and Y tilt errors in the correction mirror, and adjust the optical path length by moving the mirror along the Z axis (where the surface of the mirror is in the X and Y plane and the Z axis is normal to the mirror).

It is an object of the present invention to provide a method of optical phase control capable of adjusting the phase of the transmitted beams of telescopes by controlling the optical path lengths.

It is another object of the present invention to obtain matched optical path lengths between adjacent telescopes which emit monochromatic beams.

It is an object of the present invention to correct tilt errors in the correction mirror of an optically phased laser transmitter as well as adjust optical path lengths as required.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a signal translator circuit which may be used with an optically phased laser transmitter. The circuit receives and converts tilt error signals and phase error signals into drive signals which correct these errors with transducers which adjust a correcting mirror system.

Figure 1:
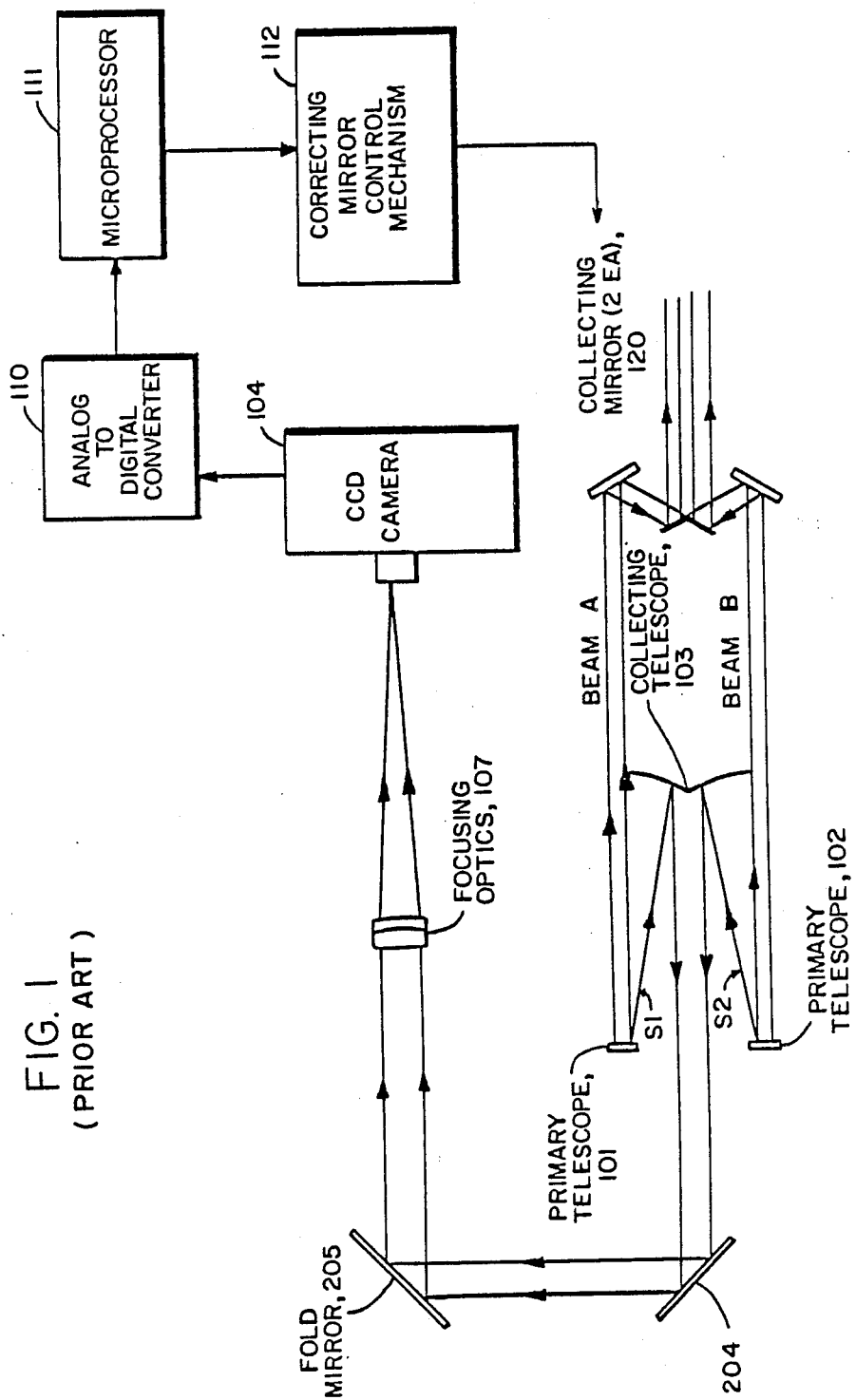
FIG. 1 is a function diagram of the optically phased laser transmitter of the Fender et al reference.

The reader's attention is now directed towards FIG. 1, which is a functional diagram of the prior art optically phased laser transmitter of the Fender et al reference. As shown in FIG. 1, the primary telescopes 101 and 102 emit two independent laser beams A and B, which may be either monochromatic or polychromatic beams.

The collecting telescope 103 collects samples of the outgoing laser beams from the edges of both telescopes 101 and 102. The collected samples are then conducted by fold mirrors 204 and 205 to the focusing optics 107, which serves to focus the samples to a common point on the array of detectors 104 where an interference pattern is created. In the invention of Fender et al, the detector array is a CCD camera, which generates the interference pattern by reading of the fringe pattern. However, a line scan or other elements known in the art are also suitable as a means of detecting the interference pattern.

From the CCD camera 104, the measurement of the interference pattern is used by a signal processing means to determine the relative phase difference between the two beams. This signal processing means consists of the analog-to-digital converter 110 which digitizes the output of the CCD camera 104, and a microprocessor 111 which uses phase generating algorithms on the interference pattern between the two sampled beams, to estimate the difference in phase between the two beams. Once the phase difference is known, the optical path length of the two beams A and B from the primary telescopes 101 and 102 can be adjusted by the set of correcting mirrors 120, as controlled by the control mechanism 112.

The laser transmitter system of FIG. 1 samples the outgoing laser beams, and matches their phases using correcting mirrors which adjust the optical path lengths of outgoing beams. In developing an optically phased laser transmitter it has been discovered that the correction mirror needs to be adjusted for tilt errors as well as optical path differences. The system of FIG. 2 provides such correction.

Figure 2:
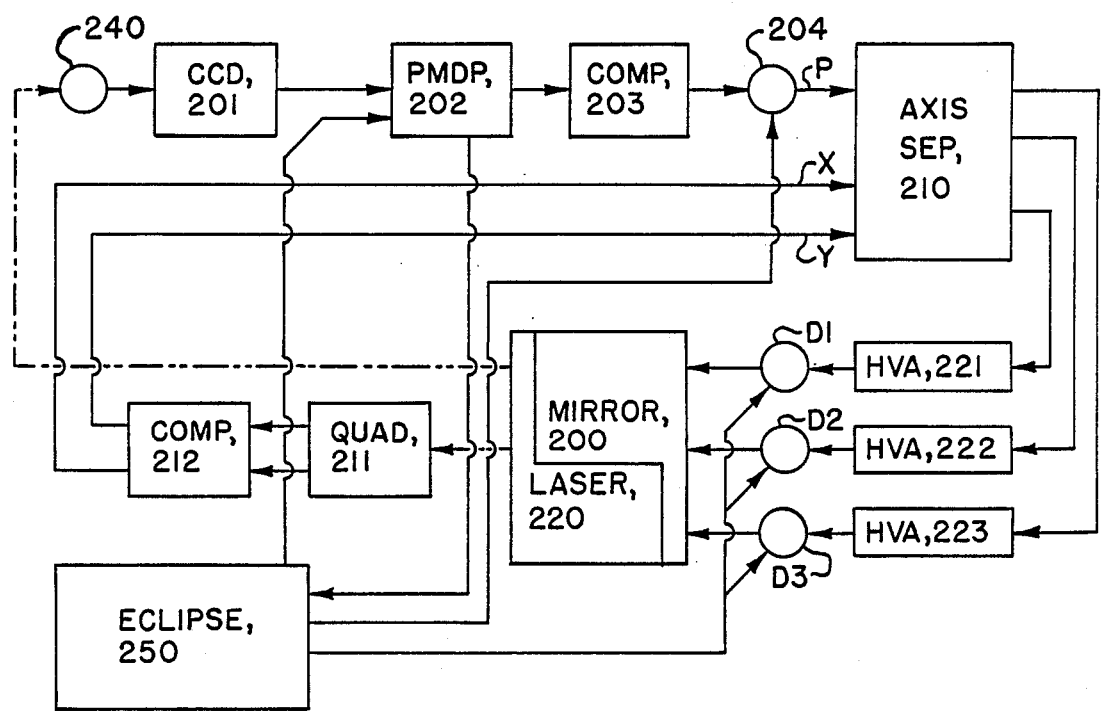
FIG. 2 is a block diagram of the control system of an optically phased laser transmitter which uses the present invention.

FIG. 2 is a block diagram of a control system of an optically phased laser transmitter which uses the present invention. The correction mirror 200 is adjusted to correct tilt errors and optical path lengths using three piezoelectric transducer stacks D1, D2 and D3. These piezoelectric stacks physically grow with applied voltage, and they receive drive signals from the axis separator electronic translator 210 which causes them to adjust the correction mirror 200.

The outgoing beams of the laser array transmitter are sampled for phase adjustment and tilt errors. The phase adjustment samples are detected by the charge coupled device (CCD) 201, phase measurement data processor 202 and comparator 203. The output of the comparator is the phase error signal which indicates how much the optical path length of a beam needs to be adjusted to bring the beams in phase with each other. Note that the phase adjustment circuit 202–204 of FIG. 2 is the essence of the above-cited Carreras reference, and need not be described in greater detail here. Control of the system is maintained by a microprocessor 250, which is a commercially available Elipse computer, model S250.

The quad 211 and comparator 212 sample the laser transmitter output beams for tilt errors. More specifically, the control mirror is deemed to be located in an X and Y plane, with a Z axis normal to the mirror. Optical path length adjustment is accomplished by moving the entire mirror along the Z axis, while tilt errors are compensated for by tilting the mirror in the X and Y plane.

Figure 3:
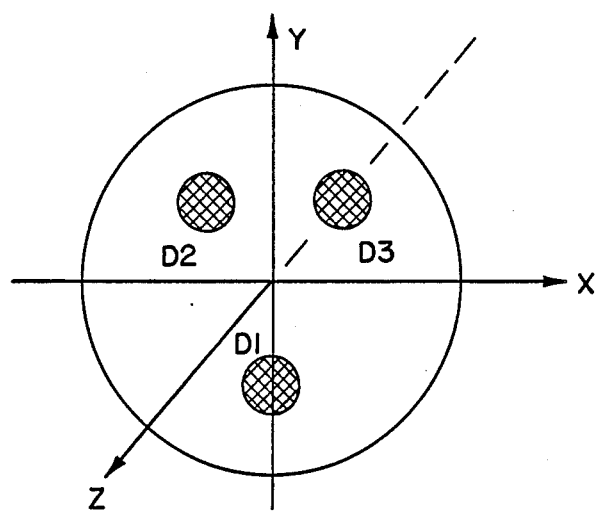
FIG. 3 is an illustration of three piezoelectric transducer stacks which are mounted behind the correction mirror to adjust it.

FIG. 3 is an illustration of the three piezoelectric transducers (PZT) D1–D3 which are mounted behind the correction mirror 200. The three piezoelectric transducers, as mentioned above, physically grow with applied voltages to move the mirror. When all three piezoelectric stacks receive equal voltage signals, the mirror 200 is more along the Z axis without any change in tilt along the X-Y plane. Tilt adjustments are discussed below.

For the purposes of this discussion the following definitions shall be used. X-tilt is considered as rotational movement about the Y-axis. Similarly, Y-tilt motion is defined as being rotational motion about the X-axis. Finally, piston motion is movement along the Z-axis in the right-hand coordinate system of FIG. 3.

In order to produce X-tilt motion on the OPD adjuster, PZTs labeled 'D2' and 'D3' should be driven while 'D1' should be undriven. Furthermore, for symmetric movement about the Y-axis 'D2' and 'D3' should be driven with equal amplitude and exactly 180° degrees out of phase with each other.

To produce Y-tilt motion, 'D2' and 'D3' is roughly twice the distance from the X-axis as 'D2' and 'D3', it should be driven at twice the amplitude.

Finally, piston motion requires coordinated motion between all three PZTs. Translation along the Z-axis requires that all three PZTs move with equal magnitude and in-phase with respect to each other. This prevents the introduction of any X-or Y-tilt motion when piston motion is commanded.

The need to coordinate the motion of the three PZTs to produce the desired motion, determines how the relative gains within the axis separator are set. These are experimentally set so that the movements described above are observed when any of the above motions is input into the axis separator.

In the system of FIG. 2, the piezoelectric transducers D1-D3 used were the commercially available transducers produced by Pi Optics. More specifically, model PZT-250 was used. These particular transducers can physically grow up to 5 microns when receiving amplified drive signals from the high voltage amplifiers 221-223. The drive signals are produced by the axis separator electronic translator 210 of the present invention, as discussed below. When $CO_2$ lasers are used with the present invention, as suggested by the Fender et al reference, the laser beams have wavelengths of 10.6 microns. The 5 micron adjustment provided by the PZT-250 transducers allows a phase adjustment of nearly 180° by the correction mirror 200.

Figure 4:
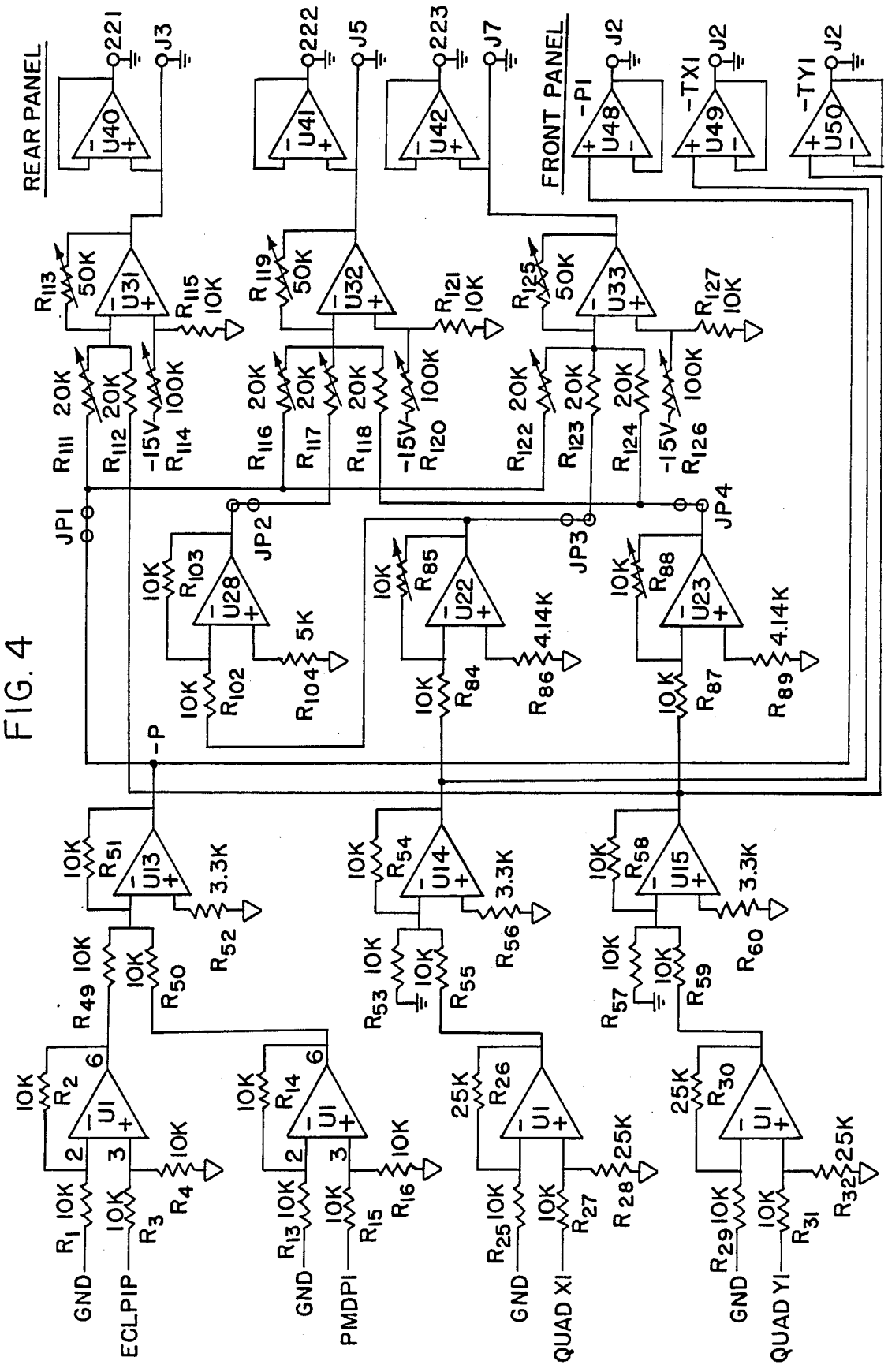
FIG. 4 is an electrical schematic of the axis separator electronic translator circuit of the present invention.

FIG. 4 is an electrical schematic of an axis separator electronic translator circuit which may be used in the system of FIG. 2. The function of the circuit of FIG. 4 is to translate X and Y tilt error signals, and phase error signals respectively into tilt adjustment signals and optical path adjustment signals to drive the piezoelectric transducer stacks. More specifically, four input amplifiers U1-U4 receive error signals. Amplifiers U3 and U4 respectively receive the measured X and Y tilt error signals denoted as QUAD X1 and QUAD Y1, from the comparator 212, as depicted in FIG. 2.

As indicated above, the correction mirror 200 is located in a plane formed by an X axis and a Y axis. The X tilt error signal is a measure of undesirable rotational tilt between the correction mirror and the Y axis. The Y tilt error signal is a measure of undesireable rotational tilt between the correction mirror 200 and the X axis. As indicated in the Fender et al reference and the Carreras reference, the phase error signal translates into a measure along the Z axis that the correction mirror 200 needs to be moved.

Amplifier U2 receives a measured phase error signal (denoted as PMD P1) produced by comparator 203, as described in the above-cited Carreras reference. As mentioned above, this will translate into a drive signal in which all three piezoelectric stacks D1-D3 are driven to change the optical path length by adjusting the correction mirror 200.

In addition to measured phase error signals, the translator circuit is capable of receiving a controlled error signal, denoted as ECLP 1P, from the Eclipse S250 microprocessor. The controlled error signal is an input from the microprocessor 250 which allows the user to initially set the optical path length and, during operation, adjust the optical path lengths of the laser transmitter.

The purpose of the summing amplifier U13 is to amplify and combine the measured phase error signal (PMD P1) with the controlled phase error signal (ECLP 1P) to produce an optical path difference adjustor signal.

Several bus driver amplifiers U14, U22, U28, and U15 with U23 are used to respectively boost the outputs amplifiers U3 and U4. One of the reasons this amplification is necessary is that the adjustment signals have two purposes. First, they are used to drive the piezoelectric transducers. For this first purpose, they are sent out amplifiers U40-U42, in the rear panel, respectively to HVA 221-223 to drive piezoelectric transducers D1-D3.

The axis separator electronic translator circuit also has a front panel which provides access to the adjustment signals it produces. Amplifiers U48-U50 output signals which are identical to those respectively output by drive amplifiers U40-U42. The purpose of this front panel is to provide test points for sampling the adjustment signals produced by the axis separator electronic translator.

These summing amplifiers U31-U33 are used to approximately combine adjustment signals before they are sent out the rear panel. All three of the amplifiers receive, as an input, the optical path difference adjustor signal from summing amplifier U13. The reason for this is that in the event that optical path length adjustment is required, all three piezostacks D1-D3 are activated to move the mirror along the Z axis.

Summing amplifier U31 sums the Y adjustor signal, from amplifier U15, with the optical path difference adjustor signal from amplifier U13. The resultant signal is amplified by output amplifier U40 of the rear panel, and sent to HVA 221 to drive piezoelectric transducer D1.

Summing amplifier U31 sums the Y adjustor signal, from amplifier U15, with the optical path difference adjustor signal from amplifier U13. The resultant signal is amplified by output amplifier U40 of the rear panel, and sent to HVA 221 to drive piezoelectric transducer D1.

Summing amplifier U32 sums the X adjustor signal, from booster amplifier U28, with the optical path difference adjustor signal from amplifier U13. The resultant signal is amplified by output amplifier U41 of the rear panel, and sent to HVA 222 to drive piezoelectric transducer D2.

Summing amplifier U33 sums the X adjustor signal, from booster amplifier U28, and the Y adjustor signal, from booster amplifier U15, with the optical path difference adjustor signal, from amplifier U13. The resultant signal is amplified by the output amplifier U42, and sent to HVA 223 to drive piezoelectric transducer D3.

In addition to the automatic control of phase and tilt errors, discussed above, the system of FIG. 2 allows users of the optically phased laser transmitter to make adjustments themselves. The piezoelectric transducer stacks D1-D3 respond to inputs directly from the microprocessor 250, as well as the three high voltage amplifiers 221-223. Additionally, the microprocessor 250 can input the controlled error signal ECLP1P, as discussed above. However, note that the user control features are not necessary to practice the invention. The axis separator electronic translator circuit of FIG. 4 can provide automatic control of tilt errors and phase errors using three input amplifiers U2-U4, three summing amplifiers U31-U33, and three output amplifiers U40-U42.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A signal translator for use with an optically phased laser transmitter which uses a correction mirror to match phases of adjacent telescopes by adjusting their optical path lengths, a means of measuring tilt errors in said correction mirror, in the form of tilt error signals, and phase errors between beams from adjacent telescopes, in the form of phase error signals, and a means of adjusting the correction mirror's position, said signal translator comprising:
    a plurality of input amplifiers which receive and amplify the phase error signals and tilt error signals from said measuring means in said optically phased laser transmitter to produce amplified tilt error signals and amplified phase error signals;
    a means for combining the amplified tilt error signals and amplified phase error signals, from the plurality of input amplifiers, into adjustment signals; and
    a plurality of output amplifiers which receive and amplify said adjustment signals from said combining means to output drive signals to said adjusting means to correct said tilt errors in said correction mirror, and to correct said phase errors in said optically phased laser transmitter.

2. A signal translator, as defined in claim 1, wherein said correction is located in a plane formed by an X-axis and a Y-axis and said tilt error signals include X and Y tilt error signals which respectively indicate undesireable rotational tilt in said correction mirror about said Y-axis and said X-axis, and wherein said plurality of input amplifiers comprise:
    a first input amplifier which produces said amplified phase error signals by receiving and amplifying said phase error signals from said measuring means; and
    second and third input amplifiers which produce said amplified tilt error signals in the form of amplified X and Y tilt error signals by respectively receiving and amplifying said X and Y tilt error signals from said measuring means.

3. A signal translator as defined in claim 2, wherein said combining means comprises:
    a first summing amplifier which produces a first adjustment signal by receiving and combining said amplified phase error signal from said first input amplifier, with said amplified Y tilt error signal from said third input amplifier;
    a second summing amplifier which produces a second adjustment signal by receiving and combining said amplified phase error signal, from said first input amplifier, with said amplified X tilt error signal from said second input amplifier; and
    a third summing amplifier which produces a third adjustment signal by receiving and combining said amplified phase error signal, from said first input amplifier, with said X tilt error signal, from said second input amplifier, and said Y tilt error signal from said third input amplifier.

4. A signal translator, as defined in claim 3, wherein said plurality of output amplifiers comprise:
    first, second and third output amplifiers which respectively produce first, second and third drive signals by respectively receiving and amplifying said first, second and third adjustment signals from said first, second and third summing amplifiers.

5. A signal translator, as defined in claim 4, wherein said X-axis and said Y-axis intersect at said correction mirror's center and wherein said adjusting means comprises:
    first, second and third high voltage amplifiers which respectively produce first, second and third amplified drive signals by respectively receiving and amplifying said first, second and third drive signals from said first, second and third output amplifiers,
    a first piezoelectric transducer stack which is fixed to said correction mirror's back along the Y-axis and beneath the X-axis, and which receives and expands in response to said first amplified drive signal from said first high voltage amplifier to adjust said correction mirror's position;
    a second piezoelectric transducer stack which is fixed to said correction mirror's back, above said X-axis and to the left of said Y-axis, and which receives and expands in response to said second amplified drive signal from said second high voltage amplifier to adjust said correction mirror's position; and
    a third piezoelectric transducer stack which is fixed to said correction mirror's back, above said X-axis and to the right of said Y-axis, and which receives and expands in response to said third amplified drive signal from said third high voltage amplifier to adjust said correction mirror's position.

6. A signal translator, as defined in claim 5, wherein said optically phased laser transmitter is controlled by a microprocessor which outputs a controlled phase error signal to adjust phase errors between beams produced, and wherein the signal translator includes:
    a fourth input amplifier which receives and amplifies the controlled phase error signal to produce an amplified controlled phase error signal; and
    a fourth summing amplifier which produces an output signal by receiving and combining said amplified phase error signal, from said fourth input amplifier, with said amplified phase error signal from said first input amplifier.

7. A signal translator, as defined in claim 6 wherein said first, second and third summing amplifiers are capable of respectively producing their first, second and third adjustment signals using the output signal of said fourth summing amplifier in place of the amplified phase error signal from the first input amplifier.

8. A signal translator, as defined in claim 7, including a means for sampling the amplified tilt error signals and amplified phase error signals used by the signal translator without interferring with the first, second and third output amplifiers.

9. A signal translator, as defined in claim 8, wherein said microprocessor produces first, second and third controlled drive signals which are respectively received and responded to by said first, second and third piezoelectric transducer stacks in addition to their response to the first, second and third amplified drive signals, said first, second and third piezoelectric transducer stacks thereby enabling users of the optically phased laser transmitter to exercise control in correcting phase errors and tilt errors.

* * * * *